United States Patent [19]

Reeves et al.

[11] Patent Number: 4,722,831
[45] Date of Patent: Feb. 2, 1988

[54] PROCESS FOR PURIFYING SILVER REFINERY SLIMES

[75] Inventors: William H. Reeves; Weldon D. Read, both of Amarillo, Tex.

[73] Assignee: ASARCO Incorporated, New York, N.Y.

[21] Appl. No.: 769,293

[22] Filed: Aug. 26, 1985
(Under 37 CFR 1.47)

[51] Int. Cl.$^4$ .............................................. C22B 11/04
[52] U.S. Cl. ........................................ 423/22; 423/39; 423/46; 423/508; 75/101 R; 75/114; 75/118 R; 75/121
[58] Field of Search .................. 423/22, 42, 38, 46, 423/508; 75/118 R, 101 R, 114 R, 121

[56] References Cited

U.S. PATENT DOCUMENTS

| | | | |
|---|---|---|---|
| 1,315,660 | 9/1919 | Ferguson | 423/22 |
| 1,996,985 | 4/1935 | Truthe | 75/118 R |
| 2,835,569 | 5/1958 | Reynaud et al. | 75/118 R |
| 4,094,668 | 5/1978 | Yannopoulos et al. | 75/118 R |
| 4,293,332 | 10/1981 | Wang et al. | 75/118 R |
| 4,331,469 | 5/1982 | Kunda | 75/118 R |
| 4,374,098 | 2/1983 | Iis et al. | 423/27 |
| 4,397,689 | 8/1983 | Lea et al. | 423/22 |

OTHER PUBLICATIONS

"Recovery, by a Nitric Acid Cycle, of Gold and Platinum Metals from the Anode Slimes Arising from the Electrolysis of Doré Metal", by B. Tougarinoff et al., pp. 741–758, 1967.

"An Outline of Metallurgical Practice", Third Edition, by C. R. Hayward, pp. 108–112.

*Primary Examiner*—Robert L. Stoll
*Attorney, Agent, or Firm*—John J. Tomaszewski; Kenneth A. Koch

[57] ABSTRACT

Gold sand resulting from the nitric acid treatment of silver refinery slimes is purified by washing with hydrochloric acid under controlled operating conditions. Platinum and other precious metals and impurities are selectively separated from the gold sand leaving a gold sand which is more efficiently refined.

6 Claims, No Drawings

PROCESS FOR PURIFYING SILVER REFINERY SLIMES

BACKGROUND OF THE INVENTION

This invention relates to an improvement of the nitric acid separation process for the recovery of precious metals from silver refinery slimes which are obtained, for example, from the electrolysis of doré bullion produced from copper refinery slimes and, in paticular, to the purification of the gold sand resulting from the nitric acid process.

The recovery of precious metals has been practiced by the metals industry for many years and one important process is the recovery of gold and silver and other precious metals from electrolytic copper refinery slimes. Electrolytic copper refinery slimes contain a variety of elements including Ag, Au, Pt, Pd, Cu, Fe, Se, Te, Pb, Sb, Ir, Sn, As, Bi, Zn, and other elements. The recovery of precious metals from these complex slimes present a formidable problem for the industry.

In general, the slimes are first decopperized and then melted in a furnace with alkali fluxes to produce a doré bullion, which is cast into anodes and electrolyzed to provide silver crystals and anode slimes. The anode slimes, contain essentially all the gold and mosst of the platinum group metals, about 5 percent of the silver, and impurities such as copper, selenium, tellurium, lead and bismuth. A description of this process is in "Ab Outline of Metallurgical Practice", Third Edition, by C. R. Hayward on pages 108-112.

The anode slimes, commonly referred to as black gold mud, are treated to recover the gold and other precious metals and one method is by leaching with concentrated sulfuric acid to separate or part the silver from the gold as a silver sulfate solution. The resulting residue is commonly referred to as gold sand and precious metals such as palladium and platinum remain with the gold sand. These metals and other impurities interfere with the gold electrolysis step wherein a pure gold cathode product is separated from the cast gold sand anode. During the electrolysis, the precious metals and impurities build-up and contaminate the electrolyte which must then be replaced and processed to recover the precious metals. This procedure is costly and time consuming.

A nitric acid process has been developed as a more economic alternative to the sulfuric acid process and a detailed description of the process is provided in an article entitled "Recovery, by a Nitric Acid Cycle, of Gold and Platinum Metals from the Anode Slimes Arising from the Electrolysis of Doré Metal" by B. Tougarinoff, F. Van Goeltsenhoven and A. Dewulf, in Advances in Extractive Metallurgy, pages 741-758, The Institution of Mining and Metallurgy, 44 Portland Place, London, W.I., 1968, the disclosure of which is hereby incorporated by reference. Basically, the nitric acid process dissolves more of the silver and palladium than the sulfuric acid process and provides a gold sand which is purer and, thus, more efficiently electrolyzed.

Unfortunately, however, most of the platinum and some of the palladium and impurities still remain in the gold sand and during refining by, for example, the Wohlwill electrolytic process, gradually build-up and contaminate the electrolyte. In general, the electrolyte concentrations must be maintained below about 80 g. Pt/liter and 70 g. Pd/liter and when the electrolyte reaches these levels, electrolyte must be bled-off and replaced with new electrolyte. The bled-off (spent) electrolyte is then treated conventionally to separate the gold, platinum and palladium.

Gold sand may be conventionally purified before electrolysis by the well-known Miller process wherein chlorine gas is injected into the molten gold sand to convert various base metals into separable chlorides. $TeCl_4$, for example, is volatilized, condensed and returned to the Doré furnace whereas silver is converted into a AgCl slag and is removed, reduced and returned to the electrolytic silver refining step. In general, the amounts of platinum group metals removed from the gold sand by this process are negligible and remain as contaminants in the gold sand.

SUMMARY OF THE INVENTION

It has now been discovered that the gold sand obtained from the nitric acid treatment of silver refinery slimes may be purified by contacting the gold sand with hydrochloric acid under controlled operating conditions. During the hydrochloric acid step, substantially all the metals other than the gold are selectively solubilized whereby a purified gold sand is obtained. The gold sand is separated from the solution, preferably washed, and cast into anodes for electrolytic purification whereas the solution is treated to recover the precious metals and other metal impurities by conventional techniques.

For convenience, the following description will be specifically directed to the treatment of the gold sand resulting from the nitric acid treatment of silver refinery slimes, and, more particularly, to the slimes arising from the electrolysis of doré bullion prepared from copper refinery slimes. It will be understood to those skilled in the art however, that the gold sand which is treatable using the process of the invention may come from any source of precious metals which have been processed with nitric acid to at least partially separate the gold from the other precious metals and impurities present therein.

DETAILED DESCRIPTION OF THE INVENTION

The silver refinery slimes generally contain mostly gold and silver with minor amounts of platinum, palladium, rhodium, iridium, copper, seleium, tellurium, iron, lead and bismuth. A preferred preliminary treatment is to decopperize the slimes and this may be performed using any of the known techniques. Usually more than 90% of the copper may be removed from the slimes without loss of precious metals.

As described in the Tougarinoff et al. article, supra, leaching of the slimes is generally carried out in two steps: (1) in dilute $HNO_3$ for 6 hours at 90° C. (slimes in excess) and (2) in concentrated $HNO_3$ for 6 hours at 110° C. (under reflux, boiling with acid in excess). After filtration and washing with water, most of the silver, palladium, rhodium, iridium, tellurium and copper are separated into the nitric acid solutions with more than 99% of the gold and about 90% of the platinum remaining in the residue (gold sand).

The nitric acid leaching process, including the water washing of the residue, may be performed under widely varying operating conditions as, for example, described in the Tougarinoff et al. article, and satisfactory leaching results have been achieved by following the methods described in the examples presented herein below.

With regard to the washing of the leach residue, it is preferred that the residue be repeatedly washed until there is essentially no silver in the wash water tested, for example, by the addition of choride ions to the wash water.

The gold sand is now treated with hydrochloric acid to selectively separate precious metals and other contaminants from the gold. It is preferred to treat the gold sand with the HCl after the nitric acid process final washing step while it is still moist because of its enhanced demonstrated operability. Preferably, the gold sand contains more than about 50% of the moisture in the filter cake resulting from the nitric acid leaching process. The moisture content of the cake may be, by weight, up to about 60%, or higher. Heating the washed gold sand at temperatures above about 250° F. to dry the sand is not necessary and is preferably avoided due to reduced leaching effectiveness. If it is desired to process dry gold sand (containing less than 30% moisture), air drying or vacuum drying at low temperatures may suitably be employed.

While the amount of moisture in the gold sand to be treated will dilute the leachant HCl, it is preferred to use concentrated HCl (10N to 12N) to treat the gold sand although dilute acid, for example, 1N to 10N, may also be employed. The volume of HCl may vary widely and will generally be a sufficient amount to form a filterable slurry. The slurry, may contain, by weight, up to about 60% solids, or higher, and is preferably about 5% to 50%, and most preferably about 20% to 40%.

The slurry is preferably mixed in a stirred heated kettle or reactor at a sufficient elevated temperature for a suitable time to selectively solubilize the platinum and other contaminants. Temperatures up to boiling for times up to a few hours, e.g., 3 hours, will generally provide the desired leaching results. A temperature range of about 60° C. to 95° C. is preferred with a more preferred range being about 80° C. to 95° C., e.g., 90° C. At the preferred temperatures and solids content a leach time of about 30 minutes to 1 to 2 hours is sufficient to treat the gold sand.

It is to be understood and stressed that the above acid and slurry concentrations, temperatures and time parameters are all interdependent and that variations in temperature, for example, will produce variations in the other parameters whereby optimum results will be attained. In this regard, the various parameters and their interdependency are well known in the art and their interaction between one another is also well known or can be easily ascertained experimentally by one skilled in the art. In general, the leaching process produces a change in color of the gold sand from a dark brown to tan and the completion of the process may be visually ascertained, if desired, on this basis.

After leaching with HCl, the slurry is filtered to separate the gold sand from the leach liquor. A preferred procedure is to wash the gold sand repeatedly with portions of water until substantially no chloride ions are present in the wash water. The amount of wash water is not critical and amounts to form a slurry having a solids content as high as 70%, or higher, may be employed.

The leach liquor, which contains platinum and other precious metals and impurities, may be processed using conventional techniques for the recovery of the metals, e.g., platinum, or combined with the spent electrolyte from the gold electrorefining process.

The gold sand is now ready for electrolytic refining by such processes as the well-known Wohlwill process.

In order to further illustrate the present invention, various Examples are set forth below. It will be understood that throughout this specification and claims, all parts and percentages are by weight and all temperatures in degrees centigrade (°C.) unless otherwise noted.

EXAMPLE I

Sixty pounds of gold mud containing about 54% water (12,491 grams on a dry basis) were contacted with 28.5 liters of nitric acid (having a concentration of about 230 g/l) for 5 hours at 90° C. in a stirred, ceramic coated, steam jacketed, 30 gallon kettle. The slurry was filtered using a Buchner funnel having a polypropylene filter cloth and washed 6 times with equal portions of room temperature water (total of 12.5 liters of wash water). The residue was transferred into the kettle and contacted with 16 liters of nitric acid (having a concentration of about 330 g/l $HNO_3$) and boiled for 4 hours, filtered and washed twice with a total of 4 liters of water.

The remaining residue (gold sand) was transferred into the kettle and contacted with 6 liters of 10N HCl for 30 minutes at 90° C., filtered and washed four times with equal portions of water (total of 8 liters of wash water).

Each of the filter cakes contained about 30% water.

Washing of the first $HNO_3$ residue was performed until the pH of the wash water was above 1. The second $HNO_3$ residue was washed until substantially no silver was present in the wash water as tested using concentrated HCl. The HCl treated residue was washed until substantially no chloride ions were present in the wash water as tested using a silver nitrate solution.

Analysis of the HCl leach liquor (including the wash water) and the final gold sand product (leached residue) showed the following results:

TABLE I

| Metal | Metal in Leach Liquor (grams) (A) | Total Metal in Leach Liquor & Leached Residue (grams) (B) | % Metal Leached (A) (100)/(B) |
|---|---|---|---|
| Gold | 67.2 | 4766.0 | 1.4 |
| Silver | 12.0 | 122.5 | 9.8 |
| Platinum | 8.8 | 9.6 | 91.7 |
| Palladium | 2.4 | 4.5 | 53.3 |
| Selenium | 2.4 | 17.5 | 13.7 |
| Tellerium | 2.9 | 3.0 | 96.7 |

The results in TABLE I clearly show the selective removal of contaminant precious metals and impurities from the gold sand. Thus, only 1.4% of the gold is leached from the gold sand compared to significant amounts of the other metals. Over 90% of the platinum, for example, is selectively leached from the gold sand.

EXAMPLE II

Example I was repeated except that the first $HNO_3$ leach used 27.5 liters of 240 g/l $HNO_3$, was stirred for 6 hours and washed 4 times with a total of 8.5 liters of water. The second $HNO_3$ leach used 16 liters of 660 g/l $HNO_3$ and was washed 6 times with a total of 12 liters of water. The following results were obtained:

TABLE II

| Metal | Metal in Leach Liquor (grams) (A) | Total Metal in Leach Liquor & Leached Residue (grams) (B) | % Metal Leached (A) (100)/(B) |
|---|---|---|---|
| Gold | 22.2 | 4320.3 | 0.5 |

TABLE II-continued

| Metal | Metal in Leach Liquor (grams) (A) | Total Metal in Leach Liquor & Leached Residue (grams) (B) | % Metal Leached (A) (100)/(B) |
| --- | --- | --- | --- |
| Silver | 5.3 | 73.9 | 7.2 |
| Platinum | 7.4 | 8.4 | 88.1 |
| Palladium | 1.0 | 3.0 | 33.3 |
| Selenium | 1.0 | 14.7 | 6.8 |
| Tellerium | 2.1 | 2.2 | 95.5 |

As in EXAMPLE I, the selective separation of contaminant precious metals and impurities from the gold sand is demonstrated in TABLE II.

It will be apparent that many changes and modifications of the several features described herein may be made without departing from the spirit and scope of the invention. It is therefore apparent that the foregoing description is by way of illustration of the invention rather than limitation of the invention.

We claim:

1. In a process for the recovery of precious metals by the nitric acid leaching of silver refinery slimes containing gold, silver, palladium, platinum, selenium and tellurium wherein silver is dissolved and separated leaving a gold sand residue containing gold, undissolved silver and impurities comprising palladium, platinum, selenium and tellurium, the improvement comprising:

contacting the gold sand with hydrochloric acid for a sufficient time to selectively leach silver, palladium, platinum, selenium and tellurium from the gold sand while leaving gold in the gold sand residue.

2. The process of claim 1 wherein the contacting of the gold sand with the hydrochloric acid is performed at temperatures of about 80° C. to 95° C.

3. The process of claim 2 wherein concentration of the hydrochloric acid in 10N to 12N.

4. The process of claim 2 wherein the gold sand is mixed with the hydrochloric acid to form a slurry containing about 5% to 50% by weight solids.

5. The process of claim 4 wherein the gold sand being treated contains more than 50% of the moisture in the filter cake resulting from the nitric acid leaching process.

6. The process of claim 5 wherein the temperature is about 80° C. to 95° C. and the contact time is up to about 2 hours.

* * * * *